United States Patent [19]

Olaniyan

[11] Patent Number: 5,852,610
[45] Date of Patent: Dec. 22, 1998

[54] REMOTE BROADCAST LISTENING SYSTEM WHICH RECEIVES RADIO/BROADCAST SIGNALS USING RECEIVERS WHICH INCLUDES ANTENNAS AND INTERCONNECTS RECEIVERS TO CUSTOMER TELEPHONES/INTERFACE MEANS

[76] Inventor: Olajide O. Olaniyan, 7811 Lockney Ave. #201, Takoma Park, Md. 20912

[21] Appl. No.: 647,829

[22] Filed: May 15, 1996

[51] Int. Cl.⁶ .............................. H04H 1/04; H04J 1/00; H04N 1/00

[52] U.S. Cl. .................... 370/486; 379/101.01; 455/5.1; 455/414; 348/7; 348/13

[58] Field of Search .................................. 348/7, 12, 13; 455/412, 5.1, 413, 414; 370/486, 401; 379/101.01, 102.03; H04N 7/173

[56] References Cited

U.S. PATENT DOCUMENTS

| | | | |
|---|---|---|---|
| 4,485,400 | 11/1984 | Lemelson et al. ......................... | 358/85 |
| 5,214,792 | 5/1993 | Alwadish .................................. | 455/45 |
| 5,283,819 | 2/1994 | Glick et al. ............................... | 379/90 |

(List continued on next page.)

OTHER PUBLICATIONS

Terraflex Data Systems . . . , Business Wire, Jun. 5, 1995.

Netmanage Posts Free Websurfer . . . , Business Wire, Feb. 6, 1996.

Progressive Networks Announces Open RealAudio(™), . . . , Busines Wire, Jan. 31, 1996.

RealAudio(™) 2.0 . . . , Comunicationweel, Jan. 8, 1996.

Internet access . . . , Work–Group Comuting Report, v6 n291, p. 19(1), Dec. 11, 1909.

(List continued on next page.)

Primary Examiner—Douglas W. Olms
Assistant Examiner—David R. Vincent

[57] ABSTRACT

A remote broadcast listening apparatus includes a conventional telephone communication system and a plurality of receivers for receiving broadcasts of electromagnetic waves and for converting the received broadcasts into signals transmissible over the telephone communication system. The receivers are connected to the telephone communication system and are deployed in diverse locations throughout the globe. A central station assembly is connected to the telephone communication system for receiving telephone-communication-system transmitted signals from the receiver and for sending control signals to the receiver by way of the telephone communication system. A customer interface unit, which includes a conventional telephone, is connected to the telephone communication system for accessing the central station assembly and for receiving signals from the receiver through the central station assembly. Each of the globally-deployed receivers includes a central station assembly and can include one or more of the following functional components: an AM tuner assembly for tuning in amplitude modulated radio broadcast signals; an FM tuner assembly for tuning in frequency modulated radio broadcast signals; a volume control assembly for controlling volume of the telephone-communication-system-compatible signals; a treble control assembly for controlling treble of the telephone-communication-system compatible signals; a bass control assembly for controlling bass of the telephone-communication-system compatible signals; a mass storage device for storing received broadcast signals; a TV tuner assembly for tuning in television broadcast signals; and a SW tuner assembly for tuning in short wave broadcast signals.

10 Claims, 3 Drawing Sheets

U.S. PATENT DOCUMENTS

| | | | |
|---|---|---|---|
| 5,329,308 | 7/1994 | Binns et al. | 348/14 |
| 5,457,739 | 10/1995 | Le Cheviller | 379/93 |
| 5,499,046 | 3/1996 | Schiller et al. | 348/6 |
| 5,544,228 | 8/1996 | Wagner et al. | 379/67 |
| 5,557,541 | 9/1996 | Schulhof et al. | 364/514 |
| 5,590,282 | 12/1996 | Clynes | 395/200.02 |
| 5,594,779 | 1/1997 | Goodman | 379/59 |
| 5,604,737 | 2/1997 | Iwami et al. | 370/352 |
| 5,613,190 | 3/1997 | Hylton | 455/3.1 |
| 5,629,867 | 5/1997 | Goldman | 364/514 |

OTHER PUBLICATIONS

Progressive Networks announces . . . , Business wire, Jan. 10, 1996.

Quarterdeck announces Internetsuite . . . , Newswire, Jan. 10, 1996.

Seattle Company to deliver Radio . . . , Seattle Times, Apr. 11, 1995.

Global 'Desktop B' . . . , Billboard, v107, 23, p. 6+, Jun. 10, 1995.

Startup Turns its On–Line Radio . . . , Engineering Times, n843, Apr. 10, 1995.

Internet–Only Radio Station . . . , Saint Paul Pioneer Press, Nov. 4, 1995.

REMOTE BROADCAST LISTENING SYSTEM WHICH RECEIVES RADIO/ BROADCAST SIGNALS USING RECEIVERS WHICH INCLUDES ANTENNAS AND INTERCONNECTS RECEIVERS TO CUSTOMER TELEPHONES/INTERFACE MEANS

BACKGROUND OF THE INVENTION

1. Field of the Invention

The present invention relates generally to obtaining information and entertainment electronically, and, more particularly, to obtaining information and entertainment by way of telephone communication links.

2. Description of the Prior Art

A variety of information services are available into which one can dial on a telephone and obtain information. Such available, dial-up information includes bank balances, weather, and sports reports. The Internet also provides a great deal of information to anybody with a computer, modem, and telephone line. For entertainment purposes, various cable television schemes have been proposed.

For example, U.S. Pat. No. 5,410,343 discloses a scheme in which video orders or programming requests can be placed with a video information provider (VIP) using a telephone link equipped with special interface circuits, namely asymmetrical digital subscriber line interface (ADSL) circuits, located at both the subscriber premises and the local telephone call office. This patent is an improvement for a device described in an earlier patent, namely U.S. Pat. No. 5,247,347, which relates to video on demand. More specifically, U.S. Pat. No. 5,410,343 involves the establishment of a digital transmission between the customer and the VIP. Earlier, subscribers were limited to a fixed set of programs, which is rather restrictive. The improved scheme allows for subscribers to request particular programming and have the requested programming transmitted at a time selected by the subscriber. With U.S. Pat. No. 5,410,343, there is a provision for an integral library of video program material at the local telephone call office, a means to know whether the subscriber is actually viewing the program requested, and a restriction capability, e.g. to bar children from certain programs. The improved scheme requires a special enhancement to the telephone twisted pair since the required bandwidth is about 500 kHz.

U.S. Pat. No. 4,381,522 discloses a cable television system in which a viewer desiring to view a particular program dials a telephone number which connects to a minicomputer. The minicomputer then schedules the program for transmission shortly afterwards to the public, while at the same time showing it on a schedule channel which is used to inform other viewers who might be interested in viewing the program. Unlike the schemes described above where transmission is to the calling user or the relatively few others who might want the same program at almost the same time, this scheme allows a user to select a program for broadcast to the rest of the subscribers.

U.S. Pat. No. 4,763,191 discloses a method of providing a nationwide dial-a-view service using a nationwide "800" number. A viewer desiring to view a given program dials the "800" number which is routed to the equipment of the appropriate vendor. The vendor equipment, after performing customer entitlement verification supplies the requested programming to the calling customer via an addressable decoder at the calling customer's television. The advantage of this scheme is that a centralized and easily known "800" number can be used nationwide to order programming, as opposed to telephone orders usually handled by local operators, which can be expensive.

U.S. Pat. No. 5,014,125 discloses an interactive television system for still video frames which uses the telephone to send command signals to a central controller. With this system, a viewer sends an indication to the central location describing the video presentation that the viewer wants to see, e.g. houses being offered for sale by a real estate service. Video frames which show the available houses are individually retrieved from a suitable storage medium, and each frame is encoded with the address of the viewer. Other viewers can simultaneously request other presentations available on the system. All addressed frames are multiplexed and sent into the transmission medium which is a trunk cable or cable TV. Each user decoder extracts the information which coincides with its own address. This way, many subscribers can get different frames at the same time. It is noted that this scheme is applicable only to still video frames, since motion video will require greatly increased bandwidth, especially if there are many subscribers. Also, appropriate circuitry is required at the premises of the subscriber.

U.S. Pat. No. 5,236,199 discloses an interactive media system in which a dual tone multi-frequency (DTMF) keypad of the telephone is converted to an appropriate unique user input device such as a mouse, joystick, keyboard, etc. The use of such an easily available telephone keypad acting as an input device permits user interaction with computer generated video programming. With this scheme, a standard telephone DTMF keypad is connected via a private or a public network to a protocol conversion system or device. The protocol conversion device interprets, validates, and acts upon the user keypad signal input and generates appropriate responses to a computer which tracks, for example, the user's current pointer's proximity to hot spots, and this is broadcast to all viewers.

U.S. Pat. No. 5,285,272 discloses a scheme of delivery of video television to an audience over a two stage communication link. The first link consists of a main distribution/ control center transmitting programs via the satellite to a set of receive station with facilities for storage. A particular receive station desiring a particular program communicates this to the distribution center over a public switched telephone network (PSTN). The receive station identification and the video program required are extracted. The distribution/control then encodes the receive station identification into the video blanking interval (VBI) of the video signal. This is called non-cyclic encoding. The cyclic encoding contains the program schedule which is available to every receive station. When the transmission for a particular receive station is obtained, it is recognized by that receive station, and the command contained in it allows the specified storage device to be activated and store the video signal. The second stage of the communication link involves the broadcast of programs by each receive station to the audience in its coverage area.

U.S. Pat. No. 4,972,503 discloses a method and an apparatus for identifying user viewing habits using a non-invasive method, that is without modifying the user's TV set. In this scheme, a device intercepts the signal from the user's special remote control to log in the channel pressed. A disadvantage of this scheme is that the user must give up his own remote control for the special remote control which may, or may not, have the features the user desires.

U.S. Pat. No. 4,008,369 describes a telephone interface subscription cable TV system particularly suited for use in hotels, motels, and apartments. In this scheme, a user employs the telephone to access some kind of central control equipment, and the user makes his selection. Upon validation of the request, the central control equipment transmits a special enabling signal over the telephone which is inductively coupled to the user's decoder/converter. This signal enables the user to view a premium channel transmitted via cable.

U.S. Pat. No. 4,456,925 discloses a method using a conventional television receiver to make telephone calls. The method integrates a telephone with a TV, thereby allowing the user to visually see telephone numbers that have been stored in a non-volatile memory. This scheme also provides a means for rapidly dialing a telephone number using the remote control of a conventional TV.

U.S. Pat. No. 5,138,649 discloses a method that allows a portable telephone handset to be used for both regular telephone functions and as a remote control for a television receiver or a cable converter box. Unlike prior art which uses the same communication medium, e.g. an infra-red link, for both functions, this method uses a radio frequency (RF) for telephone functions and an infra-red link for remote control functions. The converter can further comprise interface means for communicating telephone signals to a central office via the television signal communication path.

It is seen in the prior art discussed above that various schemes have been proposed to improve the ability of the user to make video program selection from a video provider who charges fees for selected programs. The telephone link has played an auxiliary role of communicating selections to and from the user. However, most of these prior art schemes require the regular proprietary cable channel equipment and special equipment at the subscriber's premises to function properly.

Alternatively, attempts to carry a video program on the telephone link are proposed in U.S. Pat. Nos. 5,410,343 and 5,247,347. Such attempts require the telephone link to have a relatively large bandwidth. In addition, special equipment is required at the premises of the subscriber and at the local telephone call office for the systems to work. The channels must not be loaded. Therefore, the length of the communication link is relatively short.

Most of the prior art has been motivated by the notion that the user wants entertainment and is willing to pay for the entertainment. However, this is not always the case. The user may be interested in getting information or programming that is freely available, such as broadcast information and programming. Moreover, the user may be interested in obtaining current information, even from far off places in any part of the world. Such information and programming may be freely available to persons having a receiver in a particular broadcast locality. In addition, the user may be interested in obtaining this world-based information without the information being subject to the vagaries of atmospheric or ionospheric propagation media and the interference therefrom.

In view of the above, it would be desirable if a person were able to obtain information and programming from radio broadcasts throughout the world using a telephone and telephone communications. It would also be desirable if a person were able to obtain world-wide radio broadcasts without paying for radio transmissions. It would also be desirable to provide such radio broadcasts by way of telephone communications without making any modifications to a telephone.

Still other features would be desirable in a remote broadcast listening system. For example, it would be desirable if remote radio stations could be accessed by remote control by way of telephone communications. Extending beyond simply radio broadcasts, it would be desirable if video broadcasts could be provided in compressed form, could be stored at a user's request, and could be sent to the user by way of telephone communications.

It would also be desirable if special emergency transmissions, such as life saving information and an S. O. S. channel, could be accessed by telephone communications. It would further be desirable to be able to monitor a selected broadcast frequency in different locations, which would enable conducting radio propagation studies by using telephone communications.

Thus, while the foregoing body of prior art indicates it to be well known to obtain proprietary audio and video signals over dedicated cable lines, the prior art described above does not teach or suggest a remote broadcast listening system which has the following combination of desirable features: (1) enables a person to obtain information and programming from radio broadcasts throughout the world using a telephone and telephone communications; (2) enables a person to obtain world-wide radio broadcasts without paying for radio transmissions; (3) provides radio broadcasts by way of telephone communications without making any modifications to a telephone; (4) enables a person to obtain world-based radio broadcast information without the information being subject to the interference from atmospheric or ionospheric propagation media; (5) enables a person to access remote radio stations by remote control by way of telephone communications; (6) provides that video broadcasts can be captured, can be stored in compressed form at a user's request, and can be sent to the user by way of telephone communications; (7) provides that special emergency transmissions, such as life saving information and an S. O. S. channel, can be accessed by telephone communications; and (8) enables monitoring of a selected broadcast frequency in different locations to enable conducting radio propagation studies by using telephone communications. The foregoing desired characteristics are provided by the unique remote broadcast listening system of the present invention as will be made apparent from the following description thereof. Other advantages of the present invention over the prior art also will be rendered evident.

SUMMARY OF THE INVENTION

To achieve the foregoing and other advantages, the present invention, briefly described, provides a remote broadcast listening apparatus which includes a telephone communication system and a plurality of receivers for receiving broadcasts of electromagnetic waves and for converting the received broadcasts into signals transmissible over the telephone communication system. The receivers are connected to the telephone communication system and are located in diverse locations throughout the globe. A central station assembly is connected to the telephone communication system for receiving telephone-communication-system transmitted signals from the receivers and for sending control signals to the receivers by way of the telephone communication system. A customer interface unit is connected to the telephone communication system for accessing the central station assembly and for receiving signals from the receivers through the central station assembly. The telephone communication system includes a conventional telephone communication system.

Each of the globally-deployed receivers includes an AM tuner assembly for tuning in amplitude modulated radio broadcast signals, an FM tuner assembly for tuning in frequency modulated radio broadcast signals, and control and processing equipment for converting received broadcast signals into telephone-communication-system-compatible signals. Also, each of the remote receivers further includes a volume control assembly, connected to the control and processing equipment, for controlling volume of the telephone-communication-system-compatible signals. Each of the receivers further includes a treble control assembly connected to the control and processing equipment, for controlling treble of the telephone-communication-system compatible signals. Also, each of the receivers includes a bass control assembly, connected to the control and processing equipment, for controlling bass of the telephone-communication-system compatible signals. Each of the receivers further includes a mass storage device, connected to the control and processing equipment, for storing received broadcast signals. Each of the receivers further includes a TV tuner assembly for tuning in television broadcast signals. Each of the receivers further includes a SW tuner assembly for tuning in short wave broadcast signals. The foregoing are merely exemplary; it will be appreciated that the receivers can be adapted to receive any desired portion of the electromagnetic spectrum.

In accordance with another aspect of the invention, a method is provided for delivering remote broadcasts to a consumer. The method includes the steps of making a telephone call to a central station assembly using a telephone communication system, directing the central station assembly to access a remote-broadcast receiver using the telephone communication system, converting a remotely received broadcast to telephone-communication-system-compatible signals, and sending the telephone-communication-system-compatible signals from the remote-broadcast receiver, over the telephone communication system, to the consumer.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved remote broadcast listening system which has all of the advantages of the prior art and none of the disadvantages.

It is another object of the present invention to provide a new and improved remote broadcast listening system which may be easily and efficiently manufactured and marketed.

It is a further object of the present invention to provide a new and improved remote broadcast listening system which is of durable and reliable construction.

An even further object of the present invention is to provide a new and improved remote broadcast listening system which is susceptible of a low cost of manufacture with regard to both materials and labor, and which accordingly is then susceptible of low prices of sale to the consuming public, thereby making such remote broadcast listening system available to the buying public.

Still yet a further object of the present invention is to provide a new and improved remote broadcast listening system which enables a person to obtain information and programming from radio broadcasts throughout the world using a telephone and telephone communications.

Still another object of the present invention is to provide a new and improved remote broadcast listening system that enables a person to obtain worldwide radio broadcasts without paying for radio transmissions.

Yet another object of the present invention is to provide a new and improved remote broadcast listening system which provides radio broadcasts by way of telephone communications without making any modifications to a telephone.

Even another object of the present invention is to provide a new and improved remote broadcast listening system that enables a person to obtain worldbased radio broadcast information without the information being subject to the interference from atmospheric or ionospheric propagation media.

Still a further object of the present invention is to provide a new and improved remote broadcast listening system which enables a person to access remote radio stations by remote control by way of telephone communications.

Yet another object of the present invention is to provide a new and improved remote broadcast listening system that provides that video broadcasts can be captured, can be stored in compressed form at a user's request, and can be sent to the user by way of telephone communications.

Still another object of the present invention is to provide a new and improved remote broadcast listening system which provides that special emergency transmissions, such as life saving information and an S. O. S. channel, can be accessed by telephone communications.

Yet another object of the present invention is to provide a new and improved remote broadcast listening system that enables monitoring of a selected broadcast frequency in different locations to enable conducting radio propagation studies by using telephone communications.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved remote broadcast listening system embodying the principles and concepts of the present invention will be described.

Figure 1:
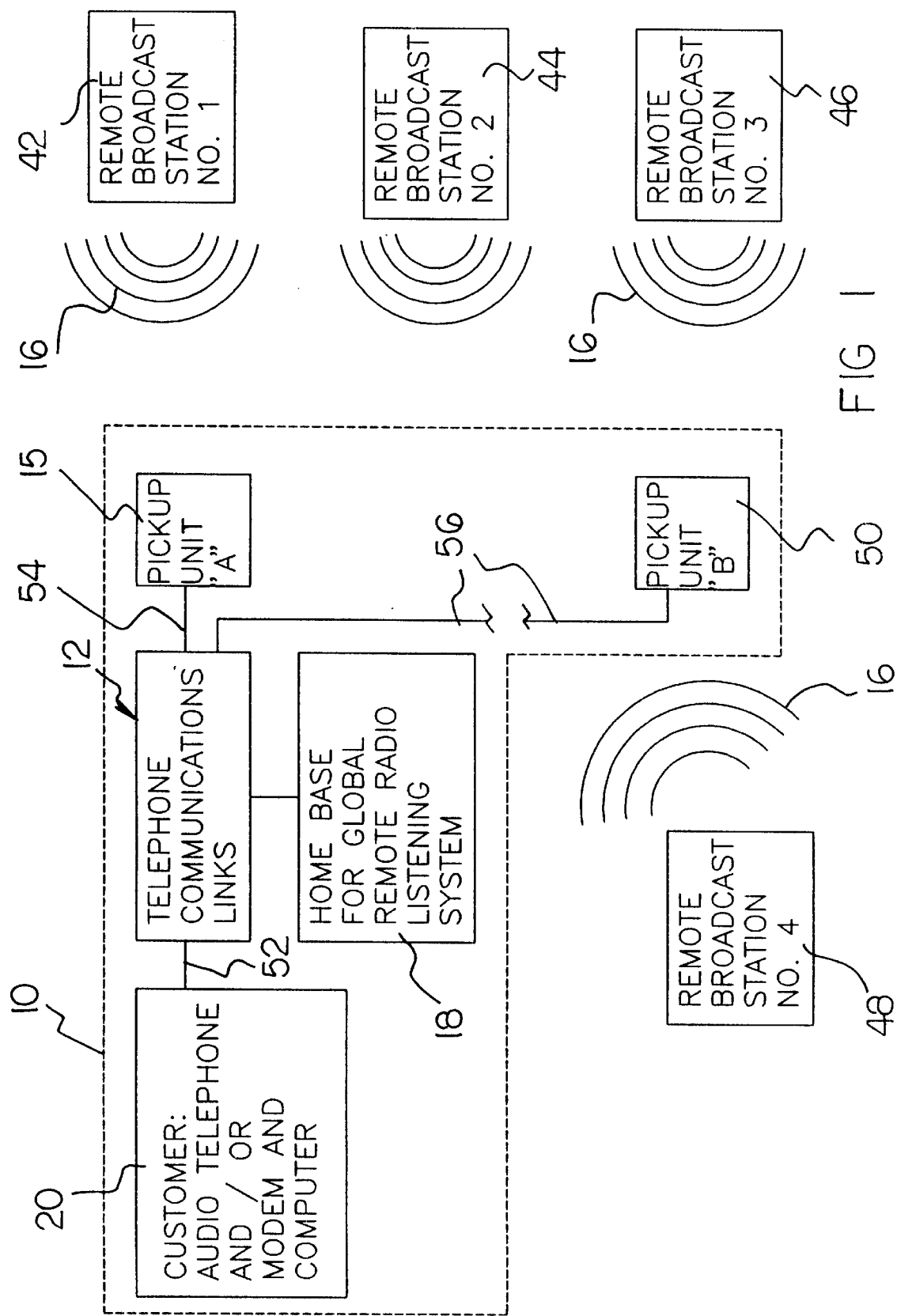
FIG. 1 is a block diagram illustrating an exemplary system for implementing a remote broadcast listening system of the invention by way of telephone communication links.
Figure 2:
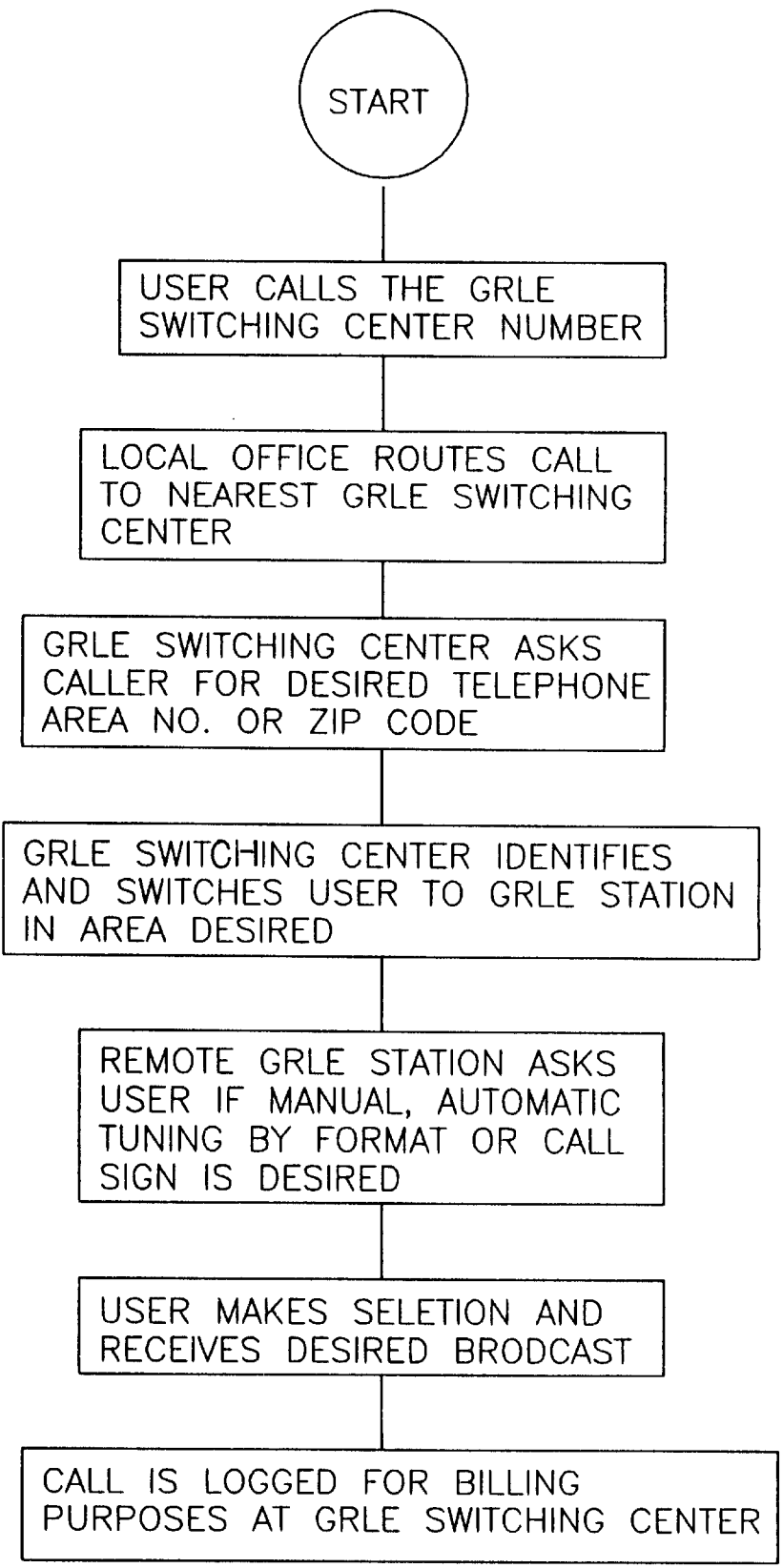
FIG. 2 is a flow chart illustrating steps to be taken by a user to listen to a broadcast at a distant location.
Figure 3:
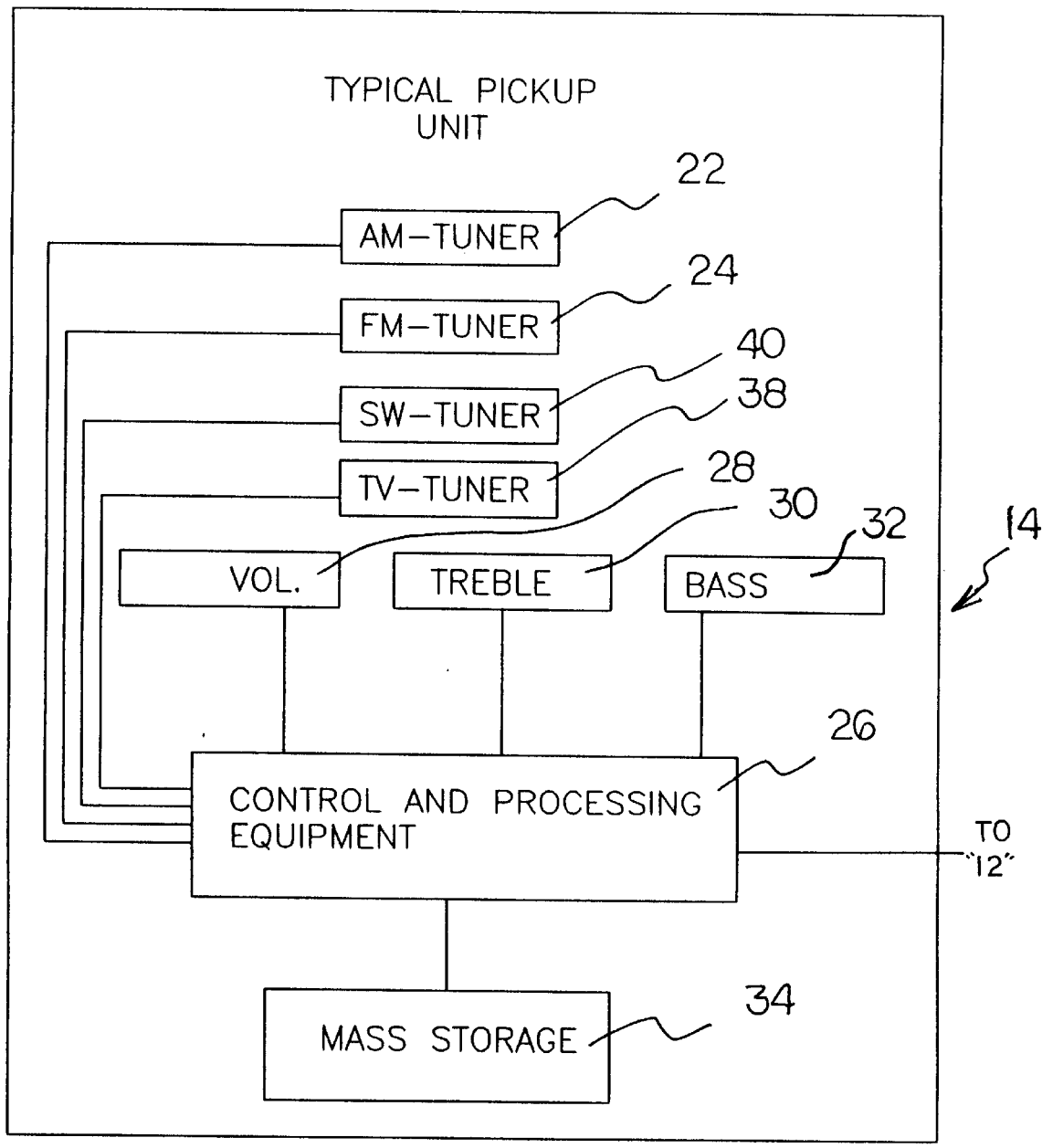
FIG. 3 is a block diagram illustrating a typical broadcast pick up unit at a distant location.

Turning to FIGS. 1–3, there is shown an exemplary embodiment of the remote broadcast listening system of the invention generally designated by reference numeral 10. In its preferred form, remote broadcast listening system 10 includes a telephone communication system 12 and a plurality of remotely-deployed receivers for receiving broadcasts of electromagnetic waves 16 and for converting the received broadcasts into signals transmissible over the telephone communication system 12. The receivers are connected to the telephone communication system 12 and can be deployed at different locations throughout the globe. A central station assembly 18 is connected to the telephone communication system 12 for receiving telephone-communication-system transmitted signals from the globally-deployed receivers and for sending control signals to the receivers by way of the telephone communication system 12. A customer interface unit 20 is connected to the telephone communication system 12 for accessing the central station assembly 18 and for receiving signals from the receivers through the central station assembly 18. The telephone communication system 12 includes a conventional telephone communication system 12. The customer interface unit 20 includes a conventional audio telephone. The central station assembly 18 can be called Global Radio Listening Equipment (GRLE) Switching Center. A receiver can be called a GRLE Station.

As shown in detail in FIG. 3, the receivers include an AM tuner assembly 22 for tuning in amplitude modulated radio broadcast signals, an FM tuner assembly 24 for tuning in frequency modulated radio broadcast signals, and control and processing equipment 26 for converting received broadcast signals into telephone-communication-system-compatible signals.

Each of the remote receivers further includes a volume control assembly 28, connected to the control and processing equipment 26, for controlling volume of the telephone-communication-system-compatible signals. Each of the receivers further includes a treble control assembly 30 connected to the control and processing equipment 26, for controlling treble of the telephone-communication-system compatible signals. Also, each of the receivers includes a bass control assembly 32, connected to the control and processing equipment 26, for controlling bass of the telephone-communication-system compatible signals. Each of the receivers further includes mass storage 34, connected to the control and processing equipment 26, for storing received broadcast signals. Each of the receivers further includes a TV tuner assembly 38 for tuning in television broadcast signals. Each of the receivers further includes a SW tuner assembly 40 for tuning in short wave broadcast signals.

To use the remote broadcast listening system 10 of the invention, a consumer employs a customer interface unit 20. More specifically, the consumer either uses an audio telephone, or the consumer uses a computer with an attached modem. The consumer dials up the telephone number of the central station assembly 18 and reaches the central station assembly 18 through a conventional, in-place, telephone communication system 12. Such a conventional telephone communication system 12 includes a local switching station and may include regional, state, and national switching systems. There can be one telephone number for the central station assembly 18 that is known nationally and internationally.

Assuming that the telephone call is from an audio telephone, the central station assembly 18 answers the consumer's telephone call and provides the consumer with audible instructions. Alternatively, if the consumer uses a computer and modem, the central station assembly 18 provides the consumer with digital instructions. The audible instructions instruct the consumer to input the digits of the telephone area or the zipcode of the area in which the remote broadcasting station that is desired is located. When this is supplied by the consumer, the central station assembly 18 routes the call to the receiver which is closest to the remote broadcasting station that is desired.

For example, referring to both FIGS. 1, 2, and 3, if a locality containing the Remote Broadcasting Station No. 1, designated by reference numeral 42, is desired, then the receiver designated as Pickup Unit A, which is in the selected locality and is indicated by reference numeral 15, is selected by the central station assembly 18. Once the central station assembly 18 makes a connection to the desired receiver, e.g. Pickup Unit A, the consumer is informed that such a connection has been made. Then, the Pickup Unit A offers the consumer a menu of choices of services that are available. For example, the Pickup Unit A can offer the consumer a choice between a radio band type (e.g. AM or FM) or a program format type (e.g. jazz or country music). If the consumer chooses a band, the consumer is given a choice of available bands. Once an available band is selected, the consumer has a choice of remotely-manually tuning to a desired broadcast station frequency using the telephone keypad, or automatic frequency tuning can be selected. In such a case, tuning is accomplished by of either the AM tuner assembly 22 or the FM tuner assembly 24. There may also be a capability to select a station by its call sign, if this is known to the consumer.

Once a broadcast station is selected, the electromagnetic waves 16 from the selected station are picked up by the Pickup Unit A and sent to the customer interface unit 20 by way of the telephone communication system 12 and the central station assembly 18. The consumer, by way of the telephone keypad, can also control volume by using the volume control assembly 28, treble by using the treble control assembly 30, and bass by using the bass control assembly 32.

In accordance with another aspect of the invention, if desired, the consumer can direct the Pickup Unit A to record a specific broadcasted program on the mass storage device 34. At a later time, the stored program can be relayed to the customer interface unit 20 when it is convenient for the consumer. As desired, a recorded program can be recorded in either analog or digital form and can be sent to the consumer in either analog or digital form. The digital sending feature can be useful for listeners of FM stereo broadcasts where high fidelity is important and the relatively large bandwidth required may not be supported by the bandwidth of the telephone link if transmitted live. In addition, by using the remote broadcast listening system 10 of the invention, a broadcasted television program can be selected and recorded in any of the internationally agreed upon compressed formats, and such a recorded program can be downloaded to the customer interface unit 20 when required. In such a case, the customer interface unit 20 would include a modem and a computer.

Similarly, if Remote Broadcasting Station No. 2 would be desired, designated by reference numeral 44, then the receiver designated as Pickup Unit A, indicated by reference numeral 15, would be selected by the central station assembly 18. On the other hand, if either Remote Broadcasting Station No. 3, designated by reference numeral 46, or Remote Broadcasting Station No. 4, designated by reference numeral 48 is desired, then the central station assembly 18 would select Pickup Unit B, indicated by reference numeral 50. It is noted that the telephone communication system 12 includes line 52 connected to the customer interface unit 20, line 54 connected to the Pickup Unit A, and line 56 connected to the Pickup Unit B. It is further noted that line 56 has a broken portion which is used to designate that Pickup Unit B may be located on a different continent of the globe from central station assembly 18.

More generally, a large number of pickup units can be deployed throughout the globe to service a large number of remote broadcast stations. A key requirement of each pickup unit is that it is connected to a telephone communication system 12.

In addition, as indicated above, if it is desired by a consumer to receive a remote television program, then a TV tuner assembly 38 of a receiver is employed. Alternatively, if it is desired by a consumer to receive a remote short wave transmission, then the SW tuner assembly 40 is employed. Whatever type of service is selected by the consumer, the central station assembly 18 keeps financial records and accounts and keeps records for purposes of billing the consumer for the services performed.

In accordance with the invention, method for providing remote broadcasts to a consumer includes the steps of making a telephone call to a central station assembly 18 using a telephone communication system 12, directing the central station assembly 18 to access a remote broadcast receiver using the telephone communication system 12, converting a remotely received broadcast to telephone-communication-system-compatible signals, and sending the telephone-communication-system-compatible signals over the telephone communication system to the consumer.

The components of the remote broadcast listening system of the invention can be made from inexpensive and durable readily available electronic components.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved remote broadcast listening system that is low in cost, relatively simple in design and operation, and which may advantageously be used to enable a person to obtain information and programming from radio broadcasts throughout the world using a telephone and telephone communications. With the invention, a remote broadcast listening system is provided which enables a person to obtain world-wide radio broadcasts without paying for radio transmissions. With the invention, a remote broadcast listening system provides radio broadcasts by way of telephone communications without making any modifications to a telephone. With the invention, a remote broadcast listening system is provided which enables a person to obtain world-based radio broadcast information without the information being subject to the interference from atmospheric or ionospheric propagation media. With the invention, a remote broadcast listening system is provided which enables a person to access remote radio stations by remote control by way of telephone communications. With the invention, a remote broadcast listening system provides that video broadcasts can be captured, can be stored in compressed form at a user's request, and can be sent to the user by way of telephone communications. With the invention, a remote broadcast listening system provides that special emergency transmissions, such as life saving information and an S. O. S. channel, can be accessed by telephone communications. With the invention, a remote broadcast listening system is provided which enables monitoring of a selected broadcast frequency in different locations to enable conducting radio propagation studies by using telephone communications.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A remote broadcast listening apparatus, comprising:
 a telephone communication system,
 a plurality of receiver means including antenna means for receiving broadcasts of electromagnetic waves and for converting the received broadcasts into signals transmissible over said telephone communication system, wherein said receiver means are connected to said telephone communication system,
 a central station assembly means, connected to said telephone communication system, for receiving telephone-communication-system transmitted signals from said receiver means and for sending control signals to said receiver means by way of said telephone communication system, and
 customer interface unit means, connected to said telephone communication system, for accessing said central station assembly means and for receiving signals from said receiver means through said central station assembly means;

said customer interface unit means including input means for transmitting an input signal designating a specific geographic region to said central station assembly means, said central station assembly means including means responsive to said input signal for interconnecting a selected one of said plurality of receiver means to said customer interface unit means corresponding to said designated specific geographic region, said central station assembly means further including means for presenting a menu of program selectable choices corresponding to different broadcast signals present in said designated specific geographic region to said customer interface unit following receipt of said signal designating a specific geographic region.

2. The system of claim 1 wherein said telephone communication system includes a conventional telephone communication system.

3. The system of claim 1 wherein said receiver means include:

an AM tuner assembly for tuning in amplitude modulated radio broadcast signals, an FM tuner assembly for tuning in frequency modulated radio broadcast signals, and control and processing equipment for converting received broadcast signals into telephone-communication-system compatible signals.

4. The system of claim 1 wherein said receiver means further include:

a volume control assembly, connected to said control and processing equipment, for controlling volume of said telephone-communication-system compatible signals.

5. The system of claim 1 wherein said receiver means further include:

a treble control assembly, connected to said control and processing equipment, for controlling treble of said telephone-communication-system compatible signals, and a bass control assembly, connected to said control and processing equipment, for controlling bass of said telephone-communication-system compatible signals.

6. The system of claim 1 wherein said receiver means further include:

mass storage means, connected to said control and processing equipment, for storing received broadcast signals.

7. The system of claim 1 wherein said receiver means further include:

a TV tuner assembly for tuning in television broadcast signals.

8. The system of claim 1 wherein said receiver means further include:

a SW tuner assembly for tuning in short wave broadcast signals.

9. The system of claim 1 wherein said receiver means include:

an AM tuner assembly for tuning in amplitude modulated radio broadcast signals, an FM tuner assembly for tuning in frequency modulated radio broadcast signals, control and processing equipment for converting received broadcast signals into telephone-communication-system compatible signals, a volume control assembly, connected to said control and processing equipment, for controlling volume of said telephone-communication-system compatible signals, a treble control assembly, connected to said control and processing equipment, for controlling treble of said telephone-communication-system compatible signals, and a bass control assembly, connected to said control and processing equipment, for controlling bass of said telephone-communication-system compatible signals, mass storage means, connected to said control and processing equipment, for storing received broadcast signals, a TV tuner assembly for tuning in television broadcast signals, control and processing equipment for converting received television broadcast signals into telephone-communication-system compatible signals, and a SW tuner assembly for tuning in short wave broadcast signals, control and processing equipment for converting received short wave broadcast signals into telephone-communication-system compatible signals, and wherein said means for presenting a menu of program selectable choices corresponding to different broadcast signals present in each said designated specific geographic region includes means responsive to said customer interface unit for selecting among said amplitude modulated radio broadcast signals, said frequency modulated radio broadcast signals, said television broadcast signals, or said short wave broadcast signals; and further includes means responsive to said customer interface unit for adjusting the volume, treble, or bass of said telephone-communication-system compatible signals, and means responsive to said customer interface unit for retrieving stored telephone-communication-system compatible signals from said mass storage means.

10. The system of claim 9 wherein said central station assembly means further includes billing means responsive to both said customer interface unit means and said means for presenting a menu of program selectable choices corresponding to different broadcast signals present in each said designated specific geographic region, for recording signals corresponding to selections made by a customer through said customer unit interface means.

* * * * *